United States Patent [19]

Shinmyo

[11] Patent Number: 5,170,395
[45] Date of Patent: Dec. 8, 1992

[54] MULTIDIRECTION MULTIPLEX COMMUNICATION SYSTEM

[75] Inventor: Saburo Shinmyo, Tokyo, Japan

[73] Assignee: NEC Corporation, Tokyo, Japan

[21] Appl. No.: 661,592

[22] Filed: Feb. 25, 1991

[30] Foreign Application Priority Data

Feb. 27, 1990 [JP] Japan ................................ 2-46066

[51] Int. Cl.[5] ................................................ H04J 3/16
[52] U.S. Cl. ................................ 370/95.3; 370/110.1; 370/85.7
[58] Field of Search ............... 370/95.3, 95.1, 85.7, 370/110.1, 105.1, 97, 104.1

[56] References Cited

U.S. PATENT DOCUMENTS 4,513,416 4/1985 Fujiwara ........................ 370/104.1
4,653,049 3/1987 Shinmyo ........................ 370/95.3

Primary Examiner—Curtis Kuntz
Assistant Examiner—T. Ghebretinsae
Attorney, Agent, or Firm—Laff, Whitesel, Conte & Saret

[57] ABSTRACT

A TDM/TDMA (Time Division Multiplex/Time Division Multiple Access) multidirection multiplex communication system of the type using a demand assignment protocol. The system has a multiframe arrangement in which each unit frame is constituted by a frame synchronization signal, a connection control signal for setting up radio channels, N conversation channels, and a single additional bit transmission channel shared by the N conversation channels. When N unit frames are combined in a multiframe format by a frame synchronization signal, N additional bit transmission channels are provided in total.

3 Claims, 4 Drawing Sheets

MULTIDIRECTION MULTIPLEX COMMUNICATION SYSTEM

BACKGROUND OF THE INVENTION

The present invention relates to a TDM/TDMA (Time Division Multiplex/Time Division Multiple Access) multidirection multiplex communication system of the type using a demand assignment protocol and, more particularly, to the arrangement of frames which increases the transmission efficiency and reduces transmission delay time in the system.

A multidirection multiplex communication system is elaborated to promote efficient communications between a single central station and a plurality of geometrically scattered subscriber stations. The central station transmits given information to the individual subscriber stations in a TDM mode, while each subscriber station separates information meant therefor from the received information. The subscriber stations each sends given information in the form of a burst signal to the central station only during an assigned time slot in a TDMA mode. In the system, the central station provides the reference on the TDM/TDMA frame for all the subscriber stations, and each subscriber station transmits the burst signal in accordance with the TDM/TDMA frame regenerated from the received signal sent from the central station. This kind of system is desired to have a simple configuration and a high transmission efficiency for transmitting comparatively small information capacities.

TDMA systems are generally classified into two types, i.e., a preassignment type system and a demand assignment type system. The preassignment type system is such that a particular time slot is assigned to each subscriber station. In the demand assignment type system, each subscriber station remains silent except for the time when it needs to transmit information, thereby increasing time slots available for the other subscriber stations. With the demand assignment type system, therefore, it is necessary to add preamble words for timing recovery to the heads of the burst signals sent from the subscriber station. For details of a demand assignment type multidirection multiplex communication system, a reference may be made to U.S. Pat. No. 4,653,049 granted to the same inventor as the present invention.

However, the problem with the conventional demand assignment type multidirection multiplex communication system is that it cannot increase the transmission efficiency or reduce the transmission delay time satisfactorily due to the TDM/TDMA FRAME arrangement particular thereto.

SUMMARY OF THE INVENTION

It is therefore an object of the present invention to provide a multidirection multiplex communication system capable of enhancing efficient transmission and reducing the transmission time.

It is another object of the present invention to provide a generally improved multidirection multiplex communication system.

In accordance with the present invention, in a TDM/TDMA multidirection multiplex communication system of a demand assign type in which M (integer) subscriber signals are multiplexed on N (integer smaller than M) radio channels forming a radio frame arrangement in response to every call, the radio frame arrangement comprises an N multiframe format, and each frame of the N multiframe format comprises a frame synchronization signal capable of being arranged in an N multiframe format, a control channel for connection including assignment of conversation channels for call origination and termination, N conversation channels each comprising a time slot sufficient in capacity to transmit a main signal, and a channel comprising a subscriber identification number, information of call origination and termination, an error check bits.

Also, in accordance with the present invention, a TDM/TDMA multidirection multiplex communication system of a demand assign type in which M (integer) subscriber signals are multiplexed on N (integer smaller than M) radio channels forming a radio frame arrangement in response to every call, the radio frame arrangement comprises an N/I (I being an integer dividing N) multiframe format, and each frame of the N/I multiframe format comprises a frame synchronization signal capable of being arranged in an N/I multiframe format, a control channel for connection including assignment of conversation channels for call origination and termination, N/I conversation channels each comprising a time slot sufficient in capacity to transmit a main signal, and a channel comprising a subscriber identification number, information of call origination and termination, and error check bits.

Further, in accordance with the present invention, in a TDM/TDMA multidirection multiplex communication system of a demand assign type in which M (integer) subscriber signals are multiplexed on N (integer smaller than M) radio channels forming a radio frame arrangement in response to every call, means for generating the radio frame arrangement comprises a first converting section for converting M (integer) voice signals, sent from subscriber stations into M digital data signals, a control section for generating, on determining presence/absence of each of the M voice signals, a control signal for assignment, a subscriber identification number, information of call origination and termination, and error check bits, a selecting section responsive to the control signal for assigning the M digital data signals to N (smaller than M) conversation channels and outputting N digital data signals, a signal generating section for generating a multiframe timing signal and time slot timing signals, a second converting section for converting the information into a burst signal in response to the multiframe timing signal, a third converting section for converting the N digital data signals into N burst signals, and a multiplexing section for multiplexing the burst signal and the N burst signals.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
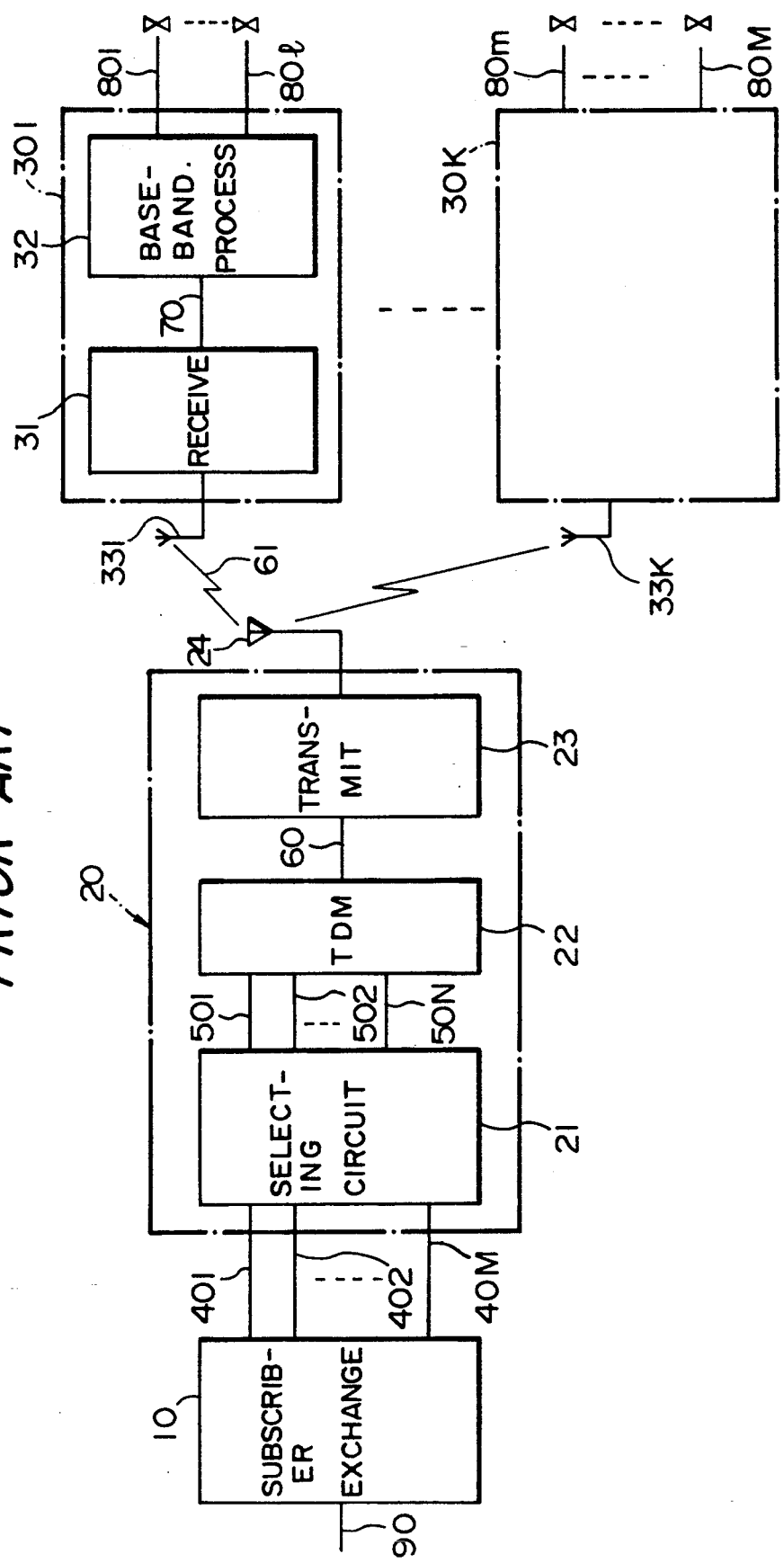
FIG. 1 is a block diagram schematically showing a conventional multidirection multiplex communication system to which the present invention is applicable.

To better understand the present invention, a brief reference will be made to a conventional demand assignment TDM/TDMA multidirection multiplex communication system, shown in FIG. 1. As shown, the system has a subscriber exchange 10, a central station 20, and K subscriber stations 301 to 30K. The subscriber exchange 10 has M subscriber lines 401 to 40M which are connected to the central station 20. The central station 20 connects the subscriber exchange 10 to the subscriber stations 301 to 30K over radio channels. M terminals are connected to the subscriber stations 301 to 30K. The central station 20 has a line selecting circuit 21 which reassembles the M subscriber lines 401 to 40M into N ($<$M) subscriber lines 501 to 50N. More specifically, the line selecting circuit 21 assigns any of the subscriber lines 401 to 40M on which a call is originated to one of the N subscriber lines 501 to 50N which is idle. A TDM circuit 22 multiplexes signals on the N subscriber lines 501 to 50N into a signal 60 having a radio frame format.

A transmitter 23 modulates and converts the multiplexed signal 60 to a radio frequency signal 61 and transmits the radio frequency signal 61 to the individual subscriber stations 301 to 30K via an antena 24.

The subscriber stations 301 to 30K have antennas 331 to 33K, respectively, and each receives the signal 61 coming in through the antenna thereof. A receiver 31 demodulates the signal 61 and thereby generates a signal 70 equivalent to the signal 61. The signal 70 is fed to a baseband processing circuit 32. In response, the baseband processing circuit 32 separates a signal on the channel which is assigned to the subscriber station. As a result, the subscriber stations 301 to 30K reproduce subscriber line signals, e.g., 801 to 80*l* and 80*m* to 80M and connect themselves to their associated terminals.

Asignal line 90 multiplexes signals coming in over the subscriber lines 401 to 40M so as to send them to a switching center. FIG. 1 shows a communication path in which the signals flow from the central station 20 to the subscriber stations 301 to 30K.

Figure 2:
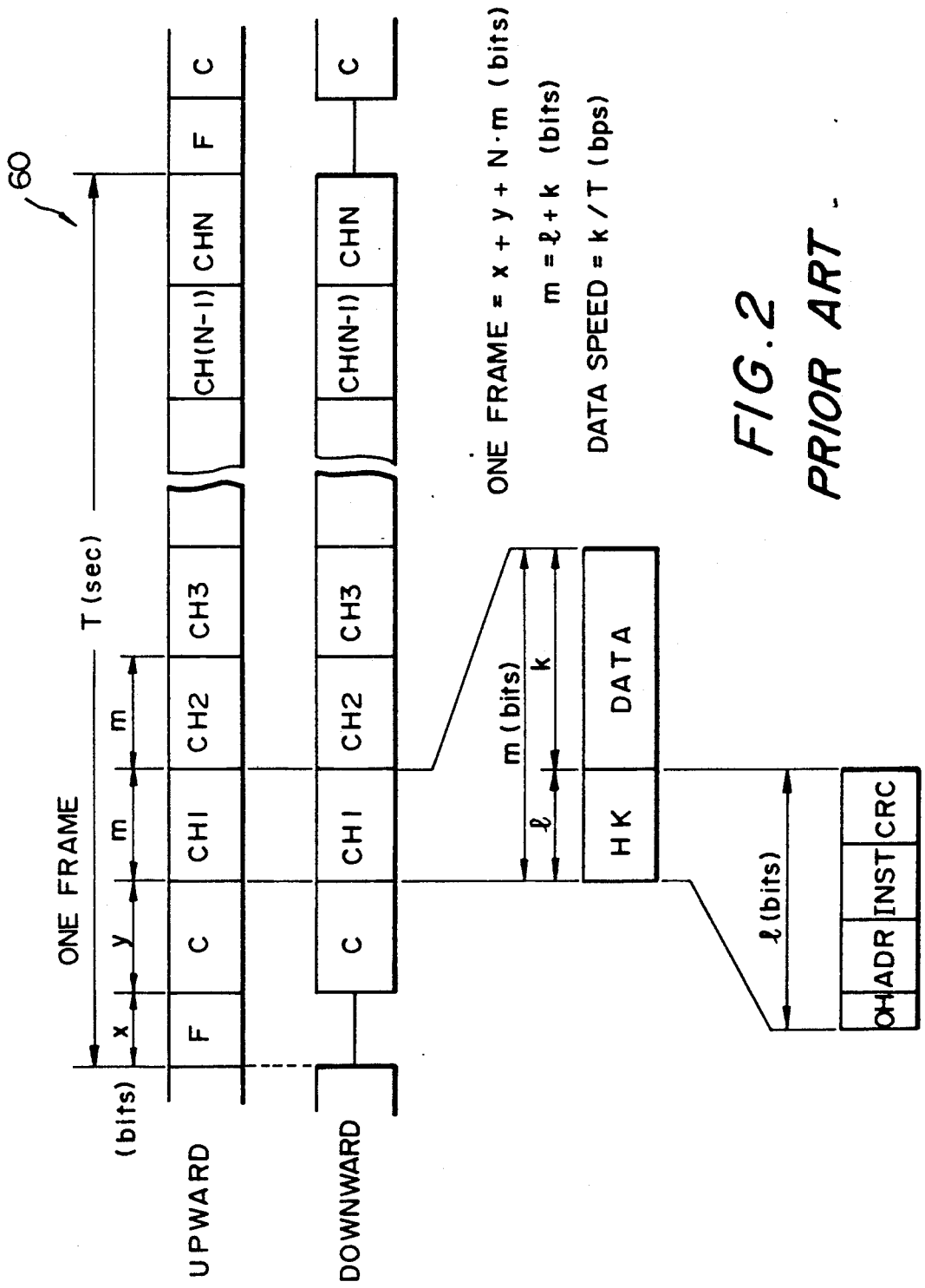
FIG. 2 shows a conventional radio frame arrangement.

FIG. 2 shows the radio frame format. The N subscriber lines 501 to 50N correspond one-to-one to the times slots of conversation channels CH1 to CHN. The subscriber lines 401 to 40M from the subscriber excange 10 each is assigned to, among the N time slots on the radio communication path, an idle time slot when a call is originated thereon. It is to be noted that terms "upward" and "downward" which are shown in the figure and will appear hereinafter refer to the subscriber-to-central direction and the central-to-subscriber direction, respectively. A frame synchronization signal F is indicative of the time reference of the radio frame, while a connection control signal C controllably sets up radio channels. The upward direction is implemented with a burst mode using TDMA wherein an assigned time slot is accessed only when connection is needed. The conversation channels CH1 to CHN each is made up of a data time slot DATA and additional bits HK associated with the time slot DATA. The time slot DATA is used to send a main signal and a signaling. The additional bits HK are constituted by an identification (ID) number ADR representative of a subscriber for which information is meant, a message INST indicative of the kind of information such as originating call, transmitting call or an end of conversation, error check bits CRC for monitoring ADR and INST for errors, and guard bits and other additional bits OH provided against upward interburst interference. The ID number ADR, message INST and error check bits CRC are information bits joining in connection.

In operation, the central station monitors the radio channels as to busy/idle and controls the channel assignment in response to terminating call incoming from the subscriber exchange 10 or originating call from the subscriber terminals. Specifically, by using the time slot assigned to the call connection control signal C, the central station reports terminating call to a subscriber terminal as well as a channel CH for call origination request. Assuming that a terminal connected to a certain subscriber station originates a call, then it multiplexes an ID number ADR particular to the station and a call origination request message INST and then sends them to the central station in the time slot of a particular conversation channel CHi which is assigned thereto over the channel C. When the central station receives the HK bits over the channel CHi correctly as indicated by the error check bit CRC, it assigns the channel CHi to the requesting terminal. Subsequently, the central station updates the assignment of conversation channels and reports it to the respective subscriber stations by the channel C. In the event of terminating call from the subscriber exchange, a subscriber station designated by a subscriber number sent over the channel C multiplexes its own ID number ADR and a call informing response message INST on the HK bit information of a designated conversation channel CHi and then returns them to the central station to set up a channel.

The above-described system sets up channels sequentially by using the respective conversation channels and, therefore, reduces connection loss, compared to channel setting which relies on the channel C only. This contributes a great deal to efficient demand assignment. However, it is necessary with such a system that the conversation channels CH1 to CHN each be provided with the bit HK in addition to the data or main signal time slot DATA. As a result, transmission efficiency in the radio frame, i.e., the ratio of the number of bits actually available for the transmission of a main signal to the total number of bits is reduced. For example, assume that a voice signal is transmitted as a 64 kbps PCM signal, and that the frame period T is 1 msec. Then, the time slot DATA has a bit length k of 64 (k)$\times$1 (m)=64 bits. On the other hand, assume that the ID number ADR and the message INST each has eight bits and used as a CRC checker (CRC 16), in which case up to $2^8=256$ subcriber terminals and the same number of messages can be accommodated. Then, the additional bits HK has at least a length l of 32 bits $+\alpha$ (number of OH bits) with the result that the efficiency of each conversation channel CH is reduced to $\frac{2}{3}$. Usually, therefore, a relatively long frame length T is selected to enhance efficient transmission. For example, when a four times longer frame length T, i.e., 4 msec is selected, the transmission efficiency is increased to 16/18 despite that the bit length of data time slot DATA is 4$\times$64=256 bits, since the additional bits HK is dependent on the required number of bits and not on the transmission rate.

While the foregoing discussion has concentrated only on the efficiency of the individual conversation channels, the efficiency of the whole frame further decreases due to the channels F and C (having x bits and y bits, respectively). Especially, when the number N of conversation channels is small, the efficiency noticeably falls.

When the frame period T is increased to achieve an allowable degree of transmission efficiency, the following problem arises. While the subscriber line signals inputted to the system appear continuously, the continuous signal is once transformed into burst signals each having the length of the time slot of the associated conversation channel. Such burst signals are again transformed by each subscriber station to reproduce the continuous signal. In the central station 20, therefore, the TDM circuit 22 once stores the input signal in a memory for the frame period T and reads it out and transmits in a burst during the time slot of the associated conversation channel. Also, in each subscriber station, the baseband processing circuit 32 once stores the successive burst signals in a memory and reads them out as a low-speed continuous signal. As a result, the downgoing signal processing time delays the transmission time by about $2 \times T$ sec. Likewise, the up-going signal processing time delays it by about $2 \times T$ sec. The total delay time amounts to bout $4 \times T$ sec except for the propagation delay time particular to the radio section. Assuming that the frame period T is 4 msec, for example, the transmission delay in the system is about 16 msec. When the subscriber line signals are voice signals, such a transmission delay time directly affects the generation of echo. Regarding a conversation between subscriber stations, when the frame period T is 4 msec as mentioned above, the transmission delay time is not negligible due to two round trips. In the event of low-speed data transmission, a much longer frame period has to be used at the sacrifice of response time and, therefore, throughput.

As stated above, the increase in transmission efficiency and the decrease in transmission delay time have heretofore been contradictive to each other.

Figure 3:
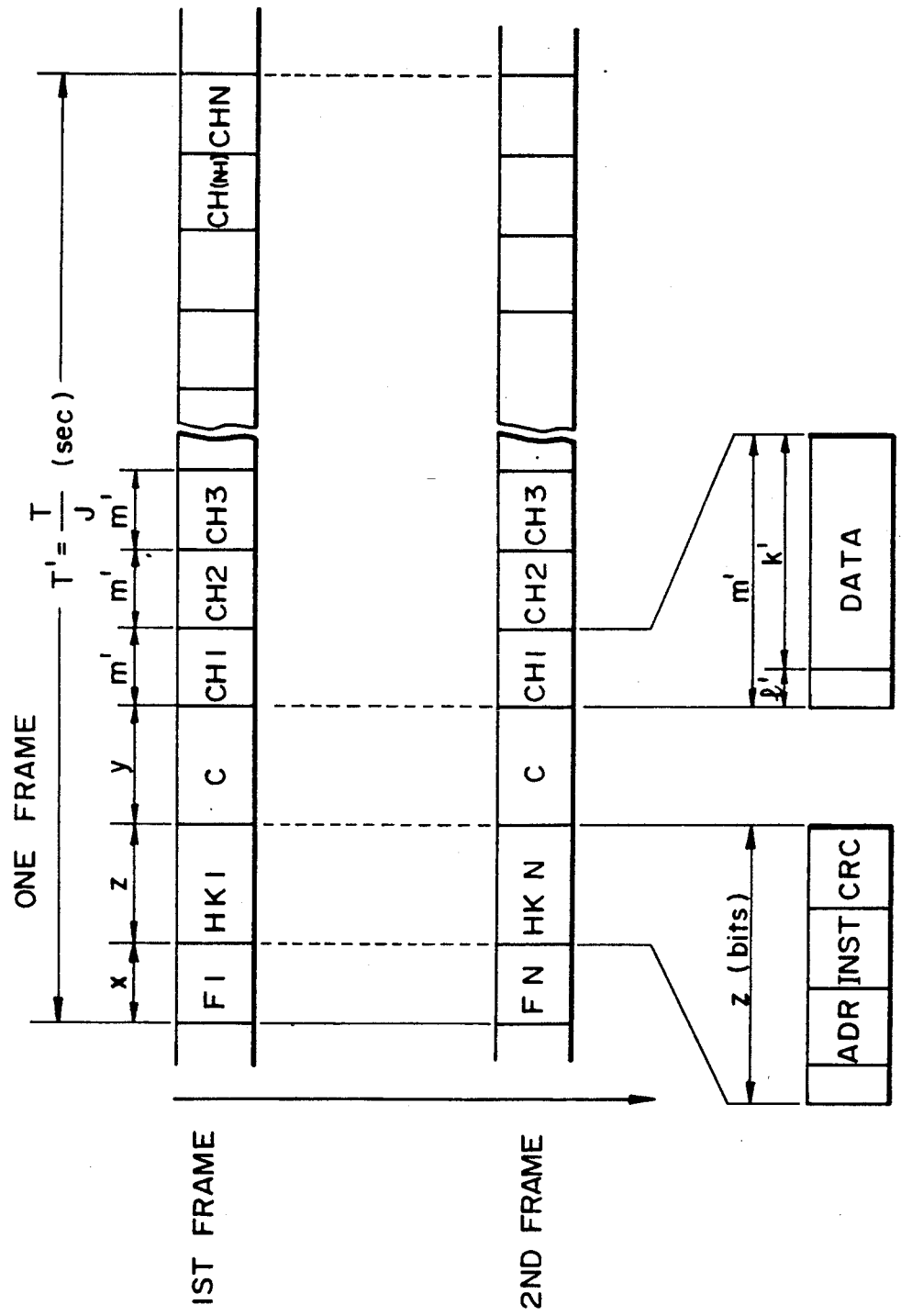
FIG. 3 shows a radio frame arrangement representative of an embodiment of the present invention.

Referring to FIG. 3, a frame arrangement representative of an embodiment of the present invention is shown. As shown, a unit frame is made up of a frame snchronization signal Fi (i=1 to N), a channel C for a connection control signal, N conversation channels CH1 to CHN, and a channel HKi (i=i to N) for the transmission of additional bits. The frame synchronization signal Fi appears at a period equal to a unit frame time T' over N frames, i.e., in a multiframe fashion. Hence, the additional bit transmission channels HK1 to HKN each being associated with the conversation channels CH1 to CHN appear at the N multiframe period. The conversation channels CH1 to CHN each has a data time slot DATA for transmitting a main signal and a signaling associated therewith, and a minimum necessary number of additional bits (OH, FIG. 2; e.g. previously mentioned guard bits). The additional bit transmission channel HKi is made up of a subscriber ID number ADR representative of an addressee or an addresser, a message INST indicating a kind of information such as terminating call, originating call or an end of conversation, error check bits CRC, and a minimum necessary number of additional bits.

A specific circuitry construction for providing the radio frame arrangement of the present invention will be described below.

Figure 4:
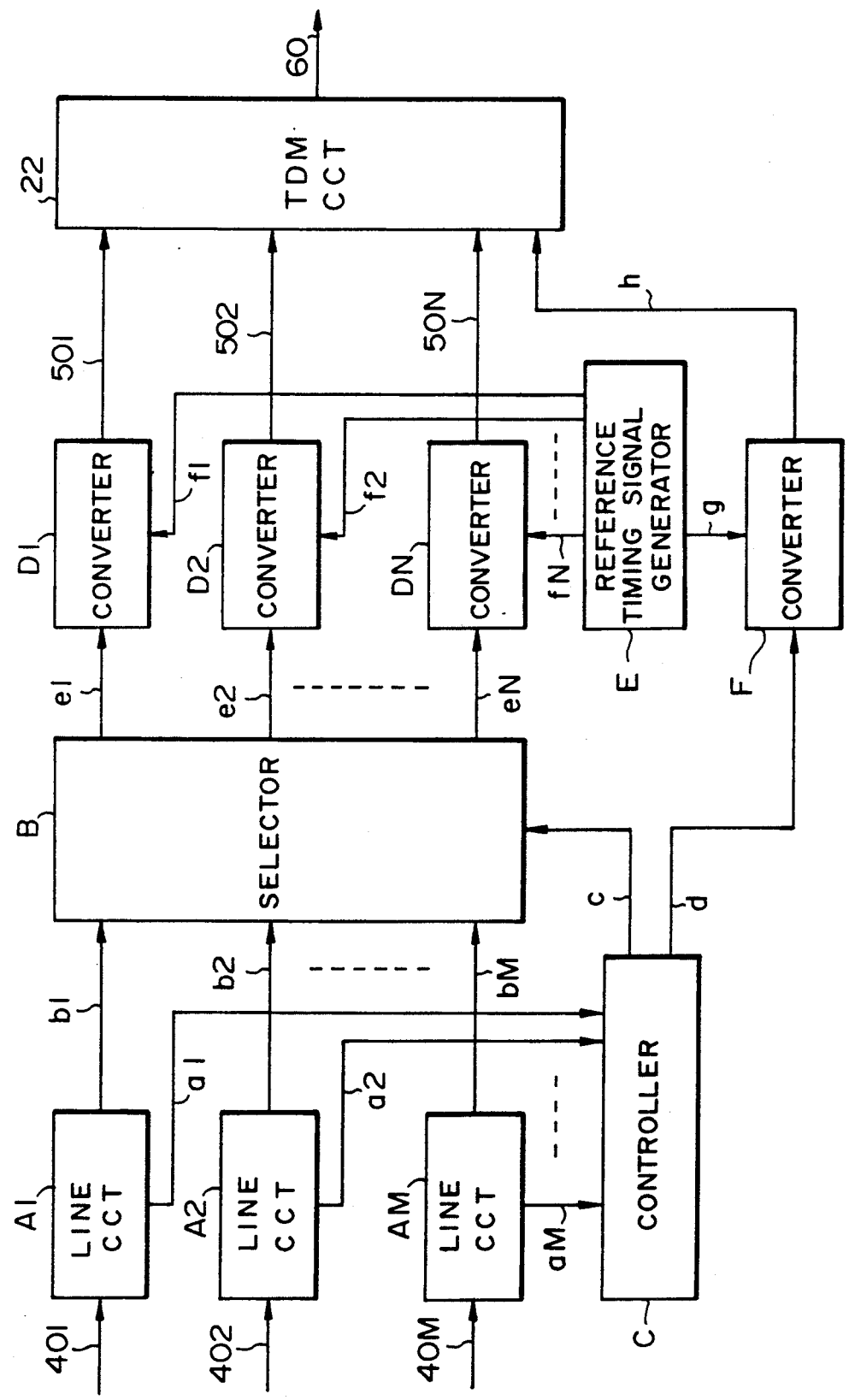
FIG. 4 is a block diagram schematically showing a specific construction of part of the system of FIG. 1.

As shown in FIG. 4, the line selecting circuit 21 has line circuits A1 to AM, a selector B, a control C, converters D1 to DN, a reference timing signal generator E, and a converter F. The line circuits A1 to AM detect the states of their associated subscriber lines 401 to 40M, i.e., whether terminating call is or not and feeds their detecting signal al to aM to the control C. At the same time, the line circuits A1 to AM convert voice signals from the subscriber exchange 10 into 64 bps PCM signals or similar digital signals b1 to bM, respectively. The selector B transfers the digital signals b1 to bM to the N idle lines as instructed by the control C. In response to the signals al to aM, the control C performs channel assignment, i.e., it generates a control signal c for connecting the subscriber signals b1 to bM to signals e1 to eN which correspond one-to-one to the radio channels CH, while generating control information d meant for the radio channels HK. The reference timing signal generator E outputs reference timing signals f1 to fN for the radio frame to thereby indicate the switching timings among the radio channels. The converters D1 to DN convert successive input signals e1 to eN into burst signals on the basis of the timing signals f1 to fN, respectively. The converter F converts the control information d from the control C into burst signals by using a multiframe reference timing signal g which is also outputted by the reference timing signal generator E. The resulted radio channel signals 501 to 50N and the HK channel signal h are multiplexed by the TDM circuit 22.

The same circuitry construction shown in FIG. 4 may be applied to any of the baseband processing circuits 32 the individual subscriber stations 301 to 30K.

It is noteworthy that the frame arrangement shown in FIG. 3 assigns only one additional bit transmission channel to the whole unit frame in association with the N conversation channels CH1 to CHN. In this respect, the transmission efficiency particular to the conventional conversation channels is expressed as:

$$\frac{k}{l+k}$$

By contrast, the illustrative embodiment achieves a transmission efficiency produced by:

$$\frac{k' \cdot N}{m' \cdot N + l(=l)} \approx \frac{k'}{m' + l/N} \approx \frac{k'}{k' + l/N} \quad (l' < k')$$

Especially, the embodiment noticeably improves the transmission efficiency over the range of $l \approx k$.

It follows that the transmission efficiency decreases little even when the unit frame time T' is far shorter than the conventional frame time T. For example, when the conventional frame time T of 4 msec, FIG. 2, is reduced to a unit frame time T' of 0.5 msec, a transmission efficiency of N/N+1 is achievable despite that the data length k' is 32 bits for 64 kbps which is the same as the length of the channel HKi. Then, assuming that the number N of conversation channels is sixteen, the delay time in the transmission of the main signal can be reduced to ¼ although the repetition period of each additional bit transmission channel HKi is $16 \times 0.5$ (msec)=8 msec which is double the conventional repetition period.

On the other hand, the additional bits transmission channel HKi does not play any essential role during conversation and is needed only at the beginning and end of connection for origination, termination, etc. Therefore, the above-stated change in the transmission delay time is little effected. In fact, a central station and each subscriber station, i.e., their control circuits need far longer processing time in the event of connection.

Alternatively, use may be made of a plurality of, I, channels for additional bit transmission KH′, (j=1 to I and i=1 to N/I) and an N/I multiframe arrangement. This is also successful in insuring the same additional bit transmission rate as the conventional transmission rate and, yet, eliminating noticeable decrease in transmission efficiency.

Of course, the combination of two additional bit transmission channels and an eight multiframe arrangement will provide a transmission rate as high as the above-stated rate and a transmission efficiency of 16/18.

In summary, the present invention arranges a radio frame in a multiframe configuration, provides each unit frame with an exclusive channel for additional bit transmission in addition to conversation channels, and thereby sends additional bits associated with the individual conversation channels on a multiple frame basis. This allows the frame period to be reduced without any noticeable decrease in transmission efficiency. Hence, the present invention is successful in insuring a required transmission efficiency while reducing the delay time in the transmission of a main signal in the system to a significant degree.

Various modifications will become possible for those skilled in the art after receiving the teachings of the present disclosure without departing from the scope thereof.

What is claimed is:

1. A TDM/TDMA multidirection multiplex communication system of a demand assign type in which M (integer) subscriber signals are multiplexed on N (integer smaller than M) radio channels forming a radio frame arrangement comprising an L (integer) multiframe arrangement in response to every call;

means for generating said radio frame arrangement comprising:

first converting means for converting M (integer) voice signals sent from subscriber stations into M digital data signals;

control means responsive to determining presence/absence of each of said M voice signals for generating a control signal for assignment, a subscriber and an additional signal containing an identification number, information of call origination and termination, and error check bits;

selecting means responsive to said control signal for assigning said M digital data signals to N (smaller than M) conversation channels and outputting N digital data signals;

signal generating means for generating a multiframe timing signal and time slot timing signals;

second converting means for converting said additional signal into a burst signal in response to said multiframe timing signal supplementing one additional signal per multiframe;

a third converting means for converting said N digital data signals into N burst signals; and multiplexing means for multiplexing said burst signal and said N burst signals and for outputting a multiplexed signal having said L multiframe arrangement.

2. The TDM/TDMA multidirection multiplex communication system of claim 1 wherein the integer N is equal to the integer L.

3. A TDM/TDMA multidirection multiplex communication system of a demand assign type in which M (integer) subscriber signals are multiplexed on N (integer smaller than M) radio channels forming a radio frame arrangement comprising an N/I (I being an integer dividing N) multiframe arrangement in response to every call;

means for generating said radio frame arrangement comprising:

first converting means for converting M (integer) voice signals sent from subscriber stations into M digital data signals;

control means responsive to determining a presence/absence of each of said M voice signals for generating a control signal for assignment, and an additional signal containing a subscriber identification number, information of call origination and termination, and error check bits;

selecting means responsive to said control signal for assigning said M digital data signals to N (an integer smaller than M) conversation channels and outputting N digital data signals;

signal generating means for generating a multiframe timing signal and time slot timing signals;

second converting means for converting said additional signal into a burst signal in response to said multiframe timing signal supplementing I additional signals per N/I multiframe;

a third converting means for converting said N digital data signals into N burst signals; and multiplexing means for multiplexing said burst signal and said N burst signals, and for outputting a multiplexed signal having said N/I multiframe arrangement.

* * * * *